United States Patent [19]
Schutte et al.

[11] Patent Number: 5,302,955
[45] Date of Patent: Apr. 12, 1994

[54] APPARATUS FOR COMBINING DATA PRODUCED FROM MULTIPLE RADARS ILLUMINATING A COMMON TARGET AREA

[76] Inventors: Peter C. Schutte, 12 Gail Ct., Huntington, N.Y. 11743; Theodore Koutsoudis, 5 Vin Ct., Farmingdale, N.Y. 11735; Ivan Kadar, 75-11 195th St., Flushing, N.Y. 11366

[21] Appl. No.: 962,911

[22] Filed: Oct. 19, 1992

[51] Int. Cl.$^5$ .................................. G01S 13/00
[52] U.S. Cl. ................................... 342/59
[58] Field of Search ......................... 342/59

[56] References Cited
U.S. PATENT DOCUMENTS
4,683,474 7/1987 Randig ..................... 342/59 X Primary Examiner—Mark Hellner

[57] ABSTRACT

An apparatus for combining signals from a plurality of radar installations is described. A methodology for combining signals from a pluraltiy of radar installations/sensors has been developed. This methodology provides enhanced target detection performance by properly fusing together the commensurate range-Doppler filter bins of each sensor. In this methodology, the processing of each of the individual radars in the Doppler frequency domain is provided such that a common velocity domain is obtained from each of the radars. Using a zero fill discrete Fourier transform, the velocity domain obtained from each radar is further normalized to have a common bin size. Additionally, for the higher frequency radars, the normalized velocity bins are unfolded so that each radar signal produces the same number of velocity bins in its respective velocity domain. Once the common velocity coordinate has been obtained a vector addition of the resulting velocity bins produces a common radar velocity signal which can be detected and processed. Combining radar signals before detection results in a gain in sensitivity over systems which combine signals after detection.

14 Claims, 7 Drawing Sheets

FIG. 7

APPARATUS FOR COMBINING DATA PRODUCED FROM MULTIPLE RADARS ILLUMINATING A COMMON TARGET AREA

The present invention relates to radar detection devices. Specifically, an apparatus is described which will provide for the combination of return signals from radars having a different PRF and carrier frequency.

It is becoming a common practice, particularly in the surveillance of aircraft, to consider the use of more than one radar to locate and identify a target. By advantageously selecting the radar carrier frequency to be either L-band S-band or C-band, different performance requirements can be met with the different radars. In particular, C-band radars are known to be effective in situations where jamming is employed, and is capable of seeing very closely-spaced targets. The lower frequency S-band and L-band radars are more suitable for long-range detection of targets. Hence, it is desirable to provide surveillance using these different radars.

Preferably, the best arrangement would be to obtain a single detected radar signal synthesized from the reflection signals from multiple radars at different PRF rates and different carrier frequencies. The combination of such signals can be done at the demodulated output stage following detection of the signal. However, a loss in system gain results by combining the signals at the detected video level.

In order to avoid the consequences of a loss in gain which can be anywhere from a theoretical 3 dB to 4.7 dB, combination of the signals before detection would be desirable. However, numerous problems are encountered when attempting to combine radar return signals. Especially acute is the problem of target range walk, and the different Doppler shift of each return. In the case of target range walk, a target which is on the boundary of two range bins may show up in each of the two range bins, and consequently, appear with its energy level split between the two range bins. Target movement across adjacent range bins results when the target has a significant radial velocity component, the radar range resolution is small and Doppler processing is done over a relatively long coherent processing interval. Other effects, such as excessive noise level, will make a target appear to be in different range bins of multiple radars, illuminating the same target. Thus, each radar may show the same target in an adjacent range bin, making the resulting combination of the signals unreliable.

The Doppler shift imparted to each illuminating signal is different because the incident radar signal for each of the radars has a different frequency. Thus, combining the Doppler component of the radar reflection requires that the differences in the radar carrier frequencies be accounted for.

SUMMARY OF THE INVENTION

It is an object of this invention to combine signals received from radars having a different PRF and carrier frequency, and consequently provide greater detection performance.

It is a more specific object of this invention to convert the Doppler shift experienced by two or more radar signals illuminating a common object into a common velocity component.

It is still another object of this invention to produce from different radars having different PRF rates the same number of points in a velocity domain obtained from Doppler filtering the respective reflected signals.

These and other objects of the invention are provided for by a system which will process radar return signals from different radars having different PRF rates and carrier frequencies tracking the same target.

Where three or more of such radars are provided, the system in accordance with the invention, will first convert the multiple pulse returns of each of the range bins (comprising a multiple number of samples of the radar signal) to a Doppler frequency domain. The Doppler frequency domain is, in turn, converted to a velocity domain common to all radars.

As the number of samples comprising the respective range bins of each radar is different, based on the fact that the PRF rates are different, and the radar wavelengths are different, each velocity bin obtained for each of the radars has a different width or resolution. The present invention provides for normalizing the width of the lower frequency radar velocity bins to equal the width of a velocity bin of the higher frequency radars.

Since the higher frequency radars produce a narrower velocity space, the higher frequency radars are further processed by unfolding the velocity domains a number of times so that the total velocity space of each of the radars is equal.

Having thus found a common coordinate for all the radars, it is possible to combine each of the velocity bins of the three radars, before detection, to obtain a composite radar velocity signal for detection.

When only two signals from two radars are to be combined, the signal processing is reduced even further. In a coherent combination of the two signals, either normalization of the velocity bin size or unfolding one of the signals is necessary. Both steps would not be required when two radars are used.

DESCRIPTION OF THE PREFERRED EMBODIMENT

In a preferred embodiment of the present invention, processing of range measurements and Doppler frequency for three radars, L-band, S-band and C-band, are provided such that range and Doppler shift components for all three radars can be combined before detection.

The advantage of coherently combining the three radar signals prior to detection results in a greater sensitivity for the system. Upwards to 3.47 to 4.75 dB in additional sensitivity can be obtained if the signals are combined before video detecting the signals.

Figure 1:
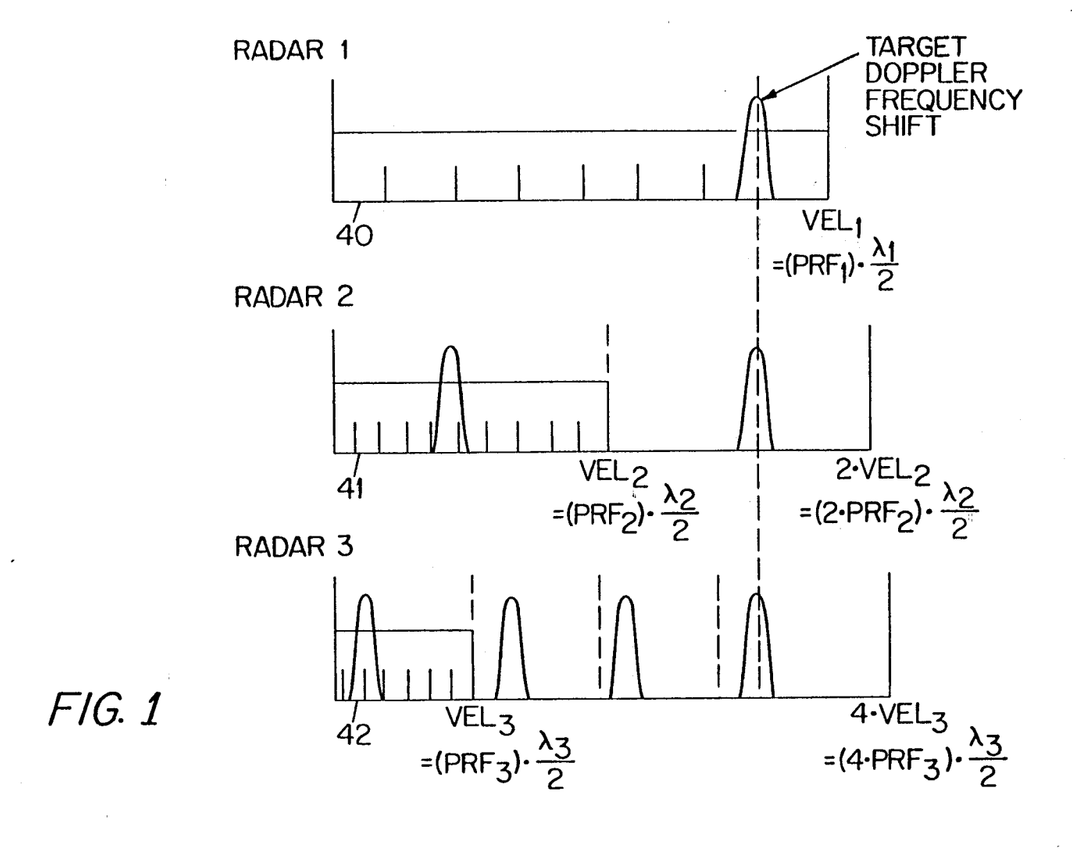
FIG. 1 illustrates the Doppler frequency spectrum obtained from each of three (3) radars operating at different PFR rates and different carrier frequencies.

In order to combine the three radar signals which originate from a common target, as shown in FIG. 1, to provide a common coordinate system for both range and Doppler frequency information, such a common coordinate frame must be found among the different radars before combining the signals. In the case of a range coordinate which is common between the radars, the process is relatively simple. This common alignment of the range bins may be obtained from the apparatus of FIG. 2, which converts each signal received on two quadrature channels I and Q from each radar, representing the two-way transit time between the target and radar, converted to a distance measurement (t/2 × velocity) into a digital signal. Each of the analog-to-digital converters 11 through 16 are operated at the same clock rate by a common clock 9. In this way, each radar signal is sampled at the same time with the same resolution and a digital representation is obtained having a common range coordinate for each channel of each of the radars. Processing of the range information is done as a series of range bins, each range bin comprising upwards to 150 samples. The range bins which may number as many as 3,000, include an amplitude value for radio frequency signal information detected at times corresponding to discrete radial distances to the target.

Adjacent range bins may exhibit target range bin walk. Range bin walk includes an apparent movement across adjacent range bins when the target has a significant radial velocity component, the radar range resolution is small, and Doppler processing is done over a relatively long coherent processing interval. The range bin walk problem can be appropriately corrected by using larger range bins, thus increasing the probability that a target will remain within the range bin during the coherent integration period and not occur at or near a boundary.

The present disclosure deals with processing the Doppler frequency components of the radar reflections to provide for a common coordinate representing the Doppler frequency observed by each of the three radars. The Doppler frequency component is different for each radar, as the Doppler frequency is a function of the carrier frequency signal of the radar. This Doppler frequency $\omega_{d,i}$ (radians per second) can be described as $$\omega_{d,i} = 2 V_{tgt} \cdot \left( \frac{\omega_{o,i}}{P_{vel}} \right)$$

The parameter $P_{vel}$ is the signal's velocity of propagation, assumed to be constant for all the radar frequencies, $\omega_{o,i}$ is the frequency of the carrier signal of the reflected signal for the ith radar, and $V_{tgt}$ is the target radial velocity component contained in the radar signal. Doppler shift is processed in a manner similar to range processing by forming discrete bins representing different values of Doppler shift $\omega_{d,i}$ of the reflection signal produced by each radar. The observed Doppler frequency shift per radar is different because $\omega_{o,i}$ is different for each radar.

This difference can be normalized by computing from the frequency shift representing the Doppler component, a corresponding velocity component $\Delta V$. $\Delta V$ is obtained by multiplying the change in frequency $\Delta F_i$ by the wavelength $\lambda_i$ of the radar carrier frequency signal.

A plurality of velocity bins is created for each range of the respective radar. FIG. 1 demonstrates each target Doppler frequency shift $\Delta F$ for each of the three radars. As can be seen, the bin size for each radar is different, with the higher frequency C-band radar having bins 42 of a smaller width, and therefore higher resolution than the Doppler frequency bins 41 and 40 of the lower frequency radars. In a first aspect of processing each of the radar signals such that they can be combined before detection, it is necessary to normalize the width of each of the Doppler frequency bins 40, 41 and 42 to have a common size, so that each radar appears to have the same resolution. The frequency bins 40, 41, 42 can then be normalized to reflect a common velocity domain by observing that velocity bins are created from frequency bins as $$\Delta f_i \cdot \frac{\lambda_i}{2}.$$

As can be seen from FIG. 1, the different operating frequencies indicate that for a common target which is located within one PRF of the L-band radar, additional velocity bins must be added to the two lower frequency radars, such that there will be the same number of velocity bins for each radar which must also satisfy the previous criteria that each velocity bin have the same width, will make it possible to combine the target Doppler shift from each of the radars before detection.

Referring again to FIG. 2, it can be seen that the range data obtained from each of the analog-to-digital converters 11 through 16 are inserted in memory buffers 19 through 24 for each of the digitized channels of each radar. This frame memory will include 150 samples selected for each of 150 consecutive radar pulses. From each of the samples of a range bin, a set of velocity range bins is computed for each range bin.

Figure 3:
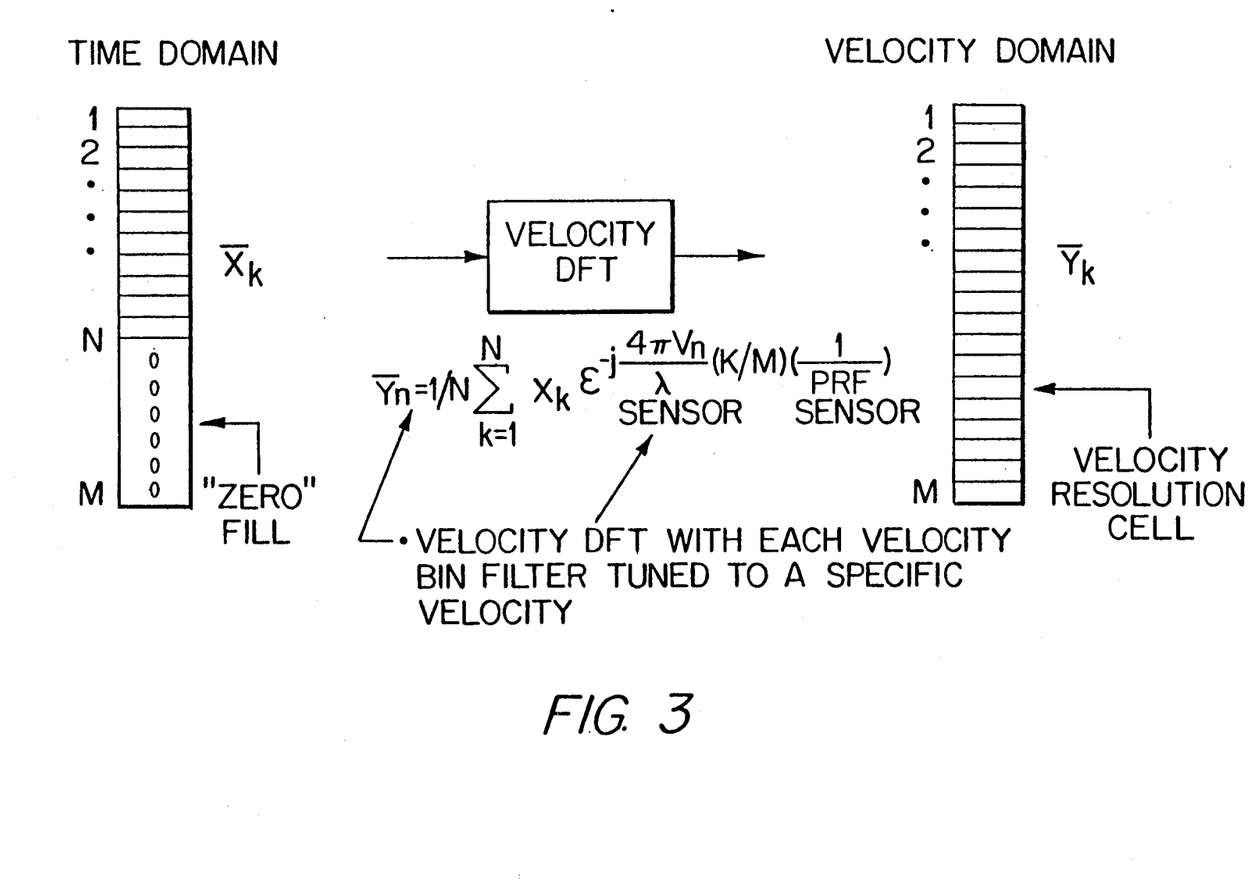
FIG. 3 illustrates the process of converting a set of pulse data samples for a given range bin to a velocity domain.

Zero fill discrete Fourier transform processors 26, 27 and 28 are employed to compute the velocity range bins from the radial distance range bins stored in buffer memory 19 through 24. The zero fill discrete Fourier transform processors 26 and 27 process the data over a velocity bin size which is sufficiently fine in resolution to equal the velocity bin size obtained from the higher frequency, C-band radar signal processing. FIG. 3 represents the transformation process applied to N samples of a range bin to form M velocity bins. Each sample $X_k$ is obtained from a radar having an operational frequency wavelength of $\lambda_{sensor}$ and a PRF rate $PRF_{sensor}$. The M velocity bins have the same resolution as the higher frequency of the C-band radar, using the transform $$Y_k = (1/N) \sum_{k=1}^{N} X_k \cdot \exp\left[ -j \cdot \left( \frac{4\pi V n}{\lambda_{sensor}} (k/M) \left( \frac{1}{PRF_{sensor}} \right) \right) \right]$$

It should be noted with respect to the above transform that M and N are equal for the complex discrete Fourier transform 28 of this channel, since no change in velocity bin size for this channel is needed. However, the transform will convert the Doppler frequency shift contained in the range data $X_k$ to a velocity coordinate. The zero fill length represents the number of additional velocity bins which, when added to the velocity resolution obtained from each of the radars before the discrete Fourier transform processing, will divide the lower frequency radar bin sizes to a value equal to the highest frequency radar bin size.

Figure 4:
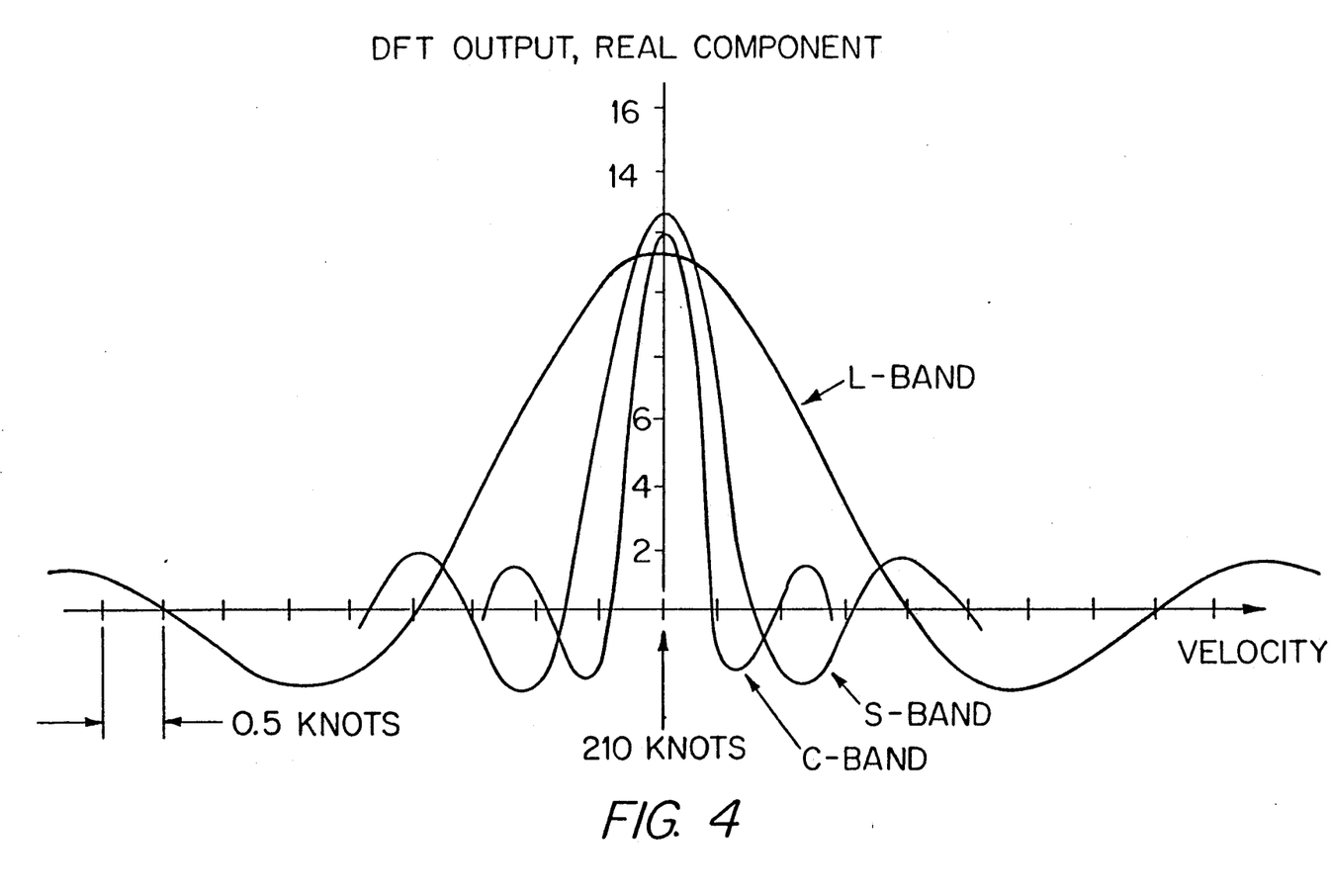
FIG. 4 illustrates the amplitude spread difference between signals produced from each of the zero fill discrete Fourier transform filters of FIG. 2.

The signal amplitudes for each of the velocity spectrums produced for each range bin are amplitude normalized. Amplitude weighting functions 29, 30 and 31 are applied such that the amplitude of the respective signals shown in FIG. 4 can be essentially the same. It turns out that each of the radars will have different gains and this step of amplitude normalization will provide for common frequency spectra having approximately the same amplitude function.

Figure 5:
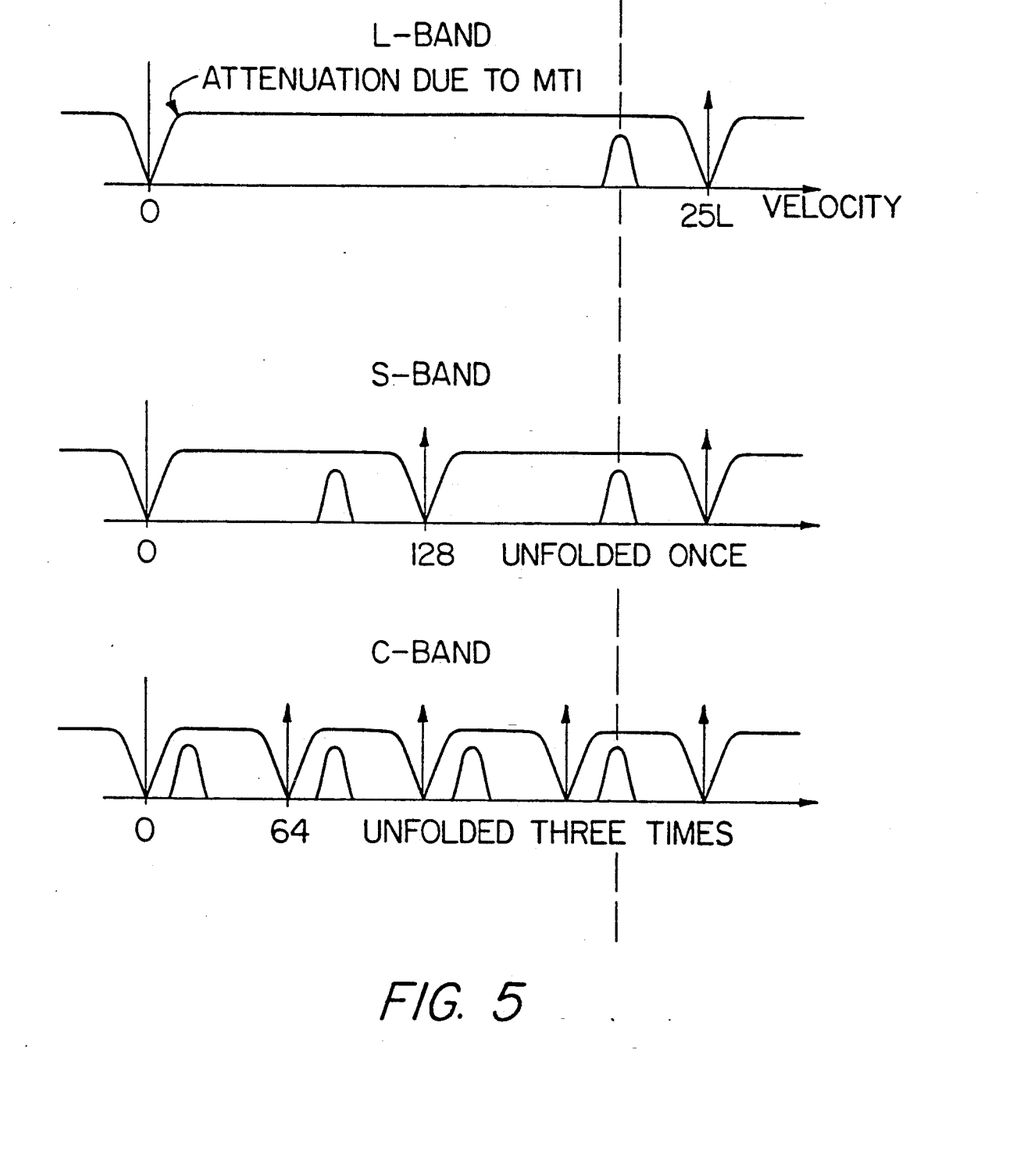
FIG. 5 illustrates the process of unfolding the velocity spectrum obtained from processing the respective radar signals.

The remaining processing step includes unfolding the higher frequency bins such that their number equal the number of bins obtained for the lower frequency lower PRF radar. The unfolding device 33, 34 of FIG. 2 can be a circuit for repeating of the bins which have been established in each of these radar channels. As is shown in FIG. 5, it is possible to unfold the S-band radar signal once by merely repeating the bins. This will place a bin in line with the bin of the L-band radar. In the case of the C-band radar, the bins are unfolded three (3) times, such that a radar bin, containing energy of the detected target, is located at the same bin as was obtained with the L-band radar.

This process produces some spurious or artificial detections at the lower order bin numbers. However, by appropriately detecting, via a threshold detection device 39, and tagging ambiguous peaks with device 40 the spurious or artificial detections can be accounted for.

This process of unfolding to produce the unfolded set from the set Y(i) produced from the discrete Fourier transform can be represented by the formula:

$$Y((j^* M_i)+i) \leftarrow Y(i)$$

where $i=1$, $M_i$ $j=O$, $N_{folds}-1$, by 1

$M_i$ represents the number of velocity bins before unfolding occurs, and $N_{folds}$ the number of times the $N_{freq}$ needs to be repeated.

In determining the unfolding process, the preferred embodiment considers the largest velocity foldover point existing in the three radars which is the L-band radar, and the smallest velocity bin size existing in the three radars, i.e., the C-band radar. The frequency bin size, $\Delta F_i$, is converted to a velocity bin size, $\Delta V$, by multiplying by $$\frac{\lambda_i}{2}.$$

The smallest of these products represents the denominator of the following equation. The numerator is the largest velocity spectrum from the set of three radars. The number of velocity bins, $M_{comb}$, in the combined unfolded and combined output is therefore $$M_{comb} = \frac{[PRF_i \times \lambda_i]max}{[\Delta f_i \cdot \lambda_i]min}$$

The value of $M_i$ for each radar is selected such that $M_{comb}$ is an integer multiple of $M_i$ for each radar. By adjusting the PRF rates it is possible to meet this integer requirement. The resulting frequency bin size and the PRF for each radar can be determined as follows:

$$\Delta f_i = 2 \frac{\Delta V}{\lambda_i}$$

$$PRF_i = M_i \Delta f_i.$$

Figure 6:
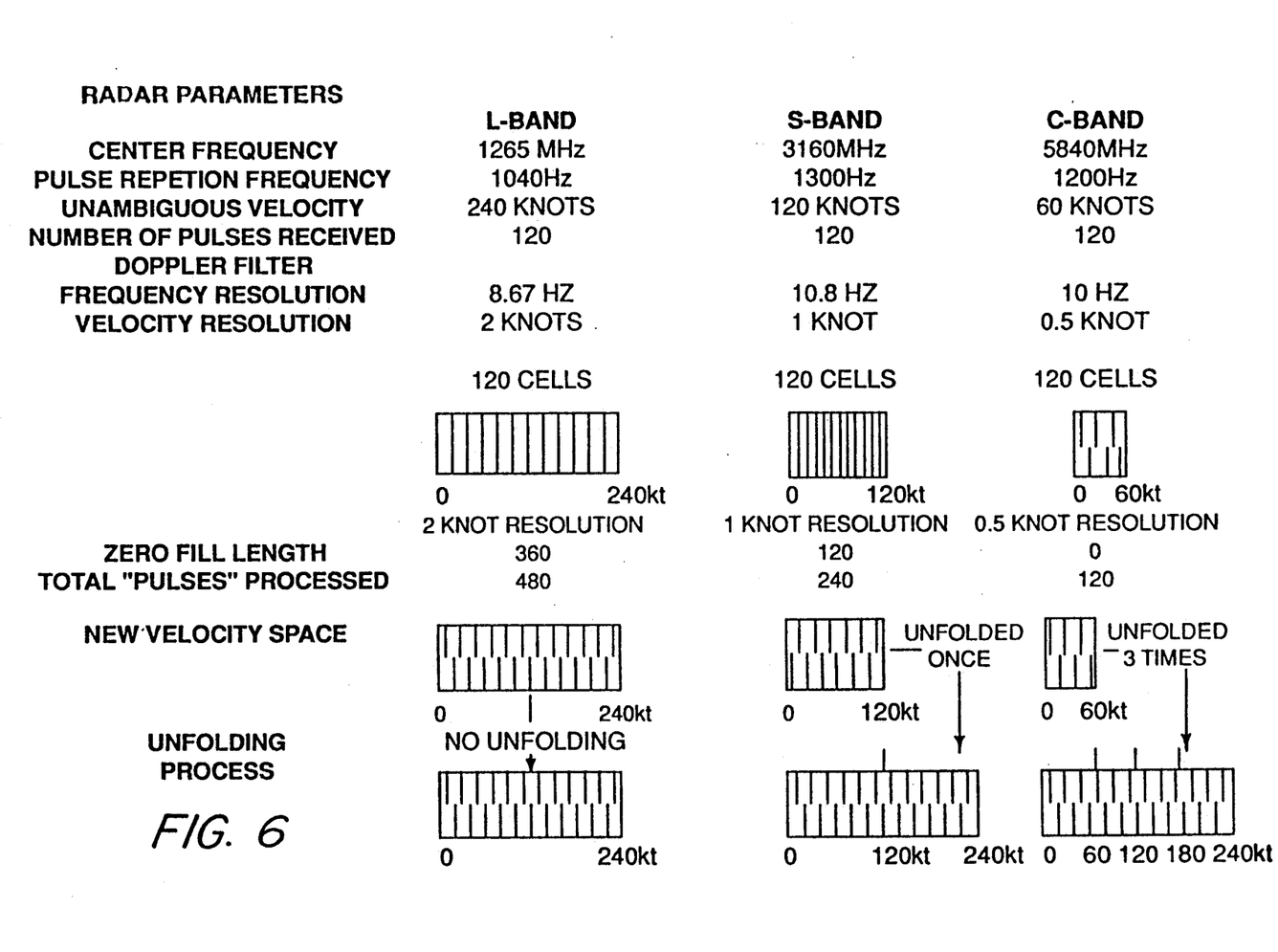
FIG. 6 shows a specific example of the preferred embodiment for producing a common velocity domain from radars operating at different PRF rates and carrier frequencies.

Referring to FIG. 6, a practical embodiment is shown for each of three radars operating in L-band, S-band and C-band. As can be seen, the unambiguous velocity from each of these radars is 240 knots, 120 knots and 60 knots. One hundred twenty (120) pulses constitute the number of coherent burst samples in a range bin. For the particular range bin being processed, there is a velocity resolution of 120 cells for each of the radars based on the 120 pulses received. Since the higher frequency radar which is operating at the higher PRF rate provides for 0.5 knots bin resolution, the lower frequency radar signals are thus converted, using the zero fill, discrete Fourier transform to have the same velocity bin size. The zero fill length added to each of the lower frequency radar velocity resolution bins is 360 and 120, respectively. The zero fill discrete Fourier transform filters provide 480 and 240 velocity bins having the same width as the C-band radar velocity bins, e.g., 0.5 knots.

As can be seen from FIG. 6, the lower frequency L-band signal frequency now has 480 velocity bins, the remaining radars have 240 and 120 velocity bins, respectively. The unfolding process provides the higher frequency radars with the additional (duplicate or ambiguous) velocity bins so that the same number of velocity bins exist in each of the signals.

The unfolding provides for an unambiguous velocity for each of the two higher frequency radars of 240 knots, thus corresponding to the lower L-band unambiguous velocity range. The unfolding is obtained by repeating each of the 240 and 120, respectively, velocity bins for the S-band and C-band radars until the full 240 knot velocity range is obtained for the S-band and C-band radars.

As FIGS. 5 and 6 indicate, each of the unfolded velocity/frequency spectrums are now equal with respect to a common coordinate having common resolution size.

Referring once again to FIG. 2, these three radar signals may now be combined to obtain a single radar signal in the frequency domain representing Doppler shift converted to a velocity coordinate.

Figure 2:
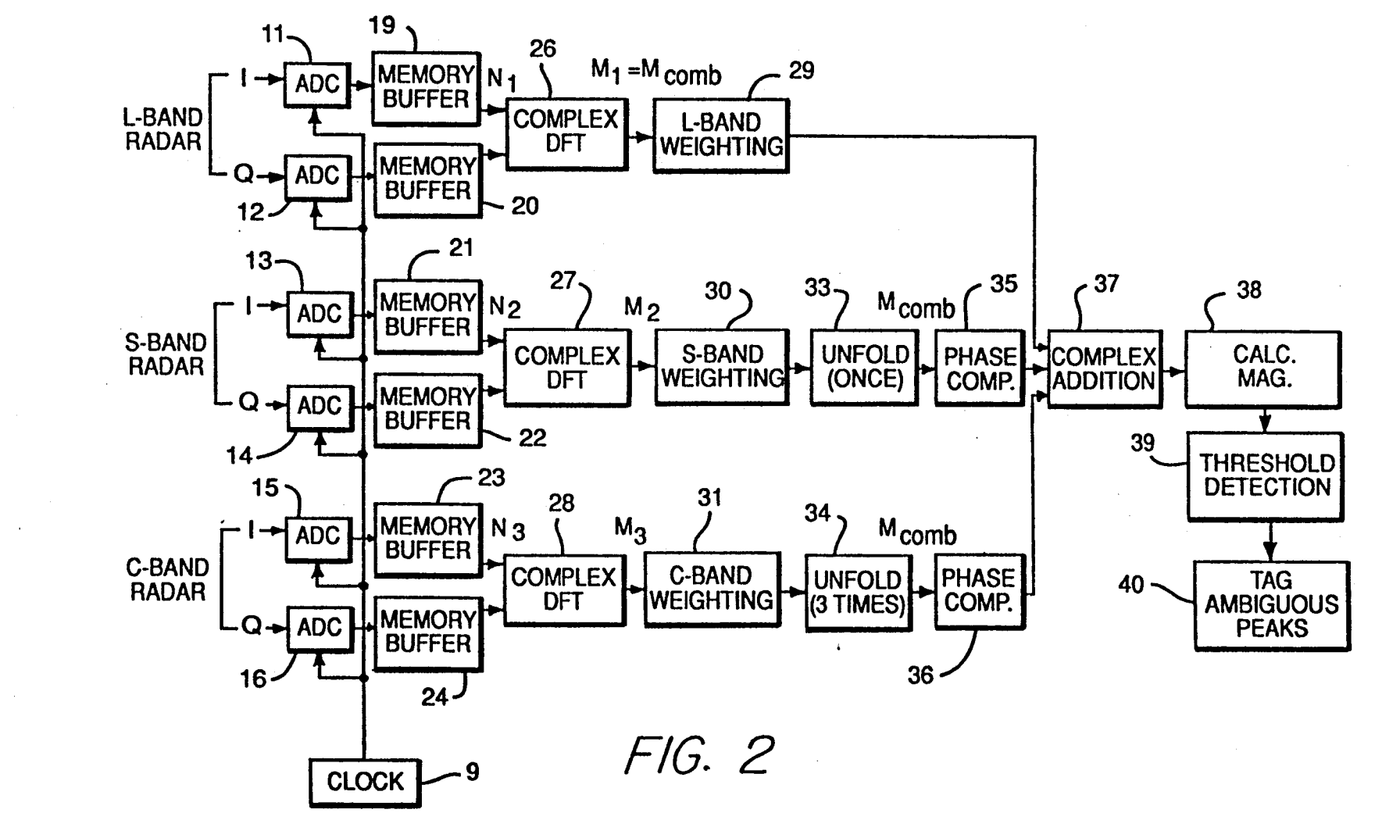
FIG. 2 is a block diagram illustrating a preferred embodiment of the invention for processing coherent radar signals.

Also shown in FIG. 2 are phase compensation devices 35, 36. In the event that the three radars provide for coherent signals having a particular phase relationship with respect to each other, phase compensation is provided in each of two of the radars to be certain that signal path length differences and other phase-inducing phenomena are removed before adding the complex frequency domain signals.

In the case of a coherent radar system, wherein each of the L-band, S-band and C-band radar signals are controlled to be sufficiently coherent with each other, the processed I and Q velocity domain signals for each channel of each of the radars, can be algebraically added together in device 37 to obtain a composite I and Q radar signal.

Following the combination of each of the signals into a composite I and Q signal, the remaining steps of calculating signal levels from the I and Q data in device 38 and then detecting in device 39 the magnitude of the signal with respect to threshold detection can occur. As is shown in FIG. 5, the unfolding process may create numerous spurious or artificial detections in the higher frequency radars representing signal content produced by the target at a lower frequency/velocity. By use of the tagging circuit of device 40, the lower order artifacts may be determined to be below a given threshold, and to be ignored, leaving only the artifact at the velocity of interest, 210 knots, for processing.

Figure 7:
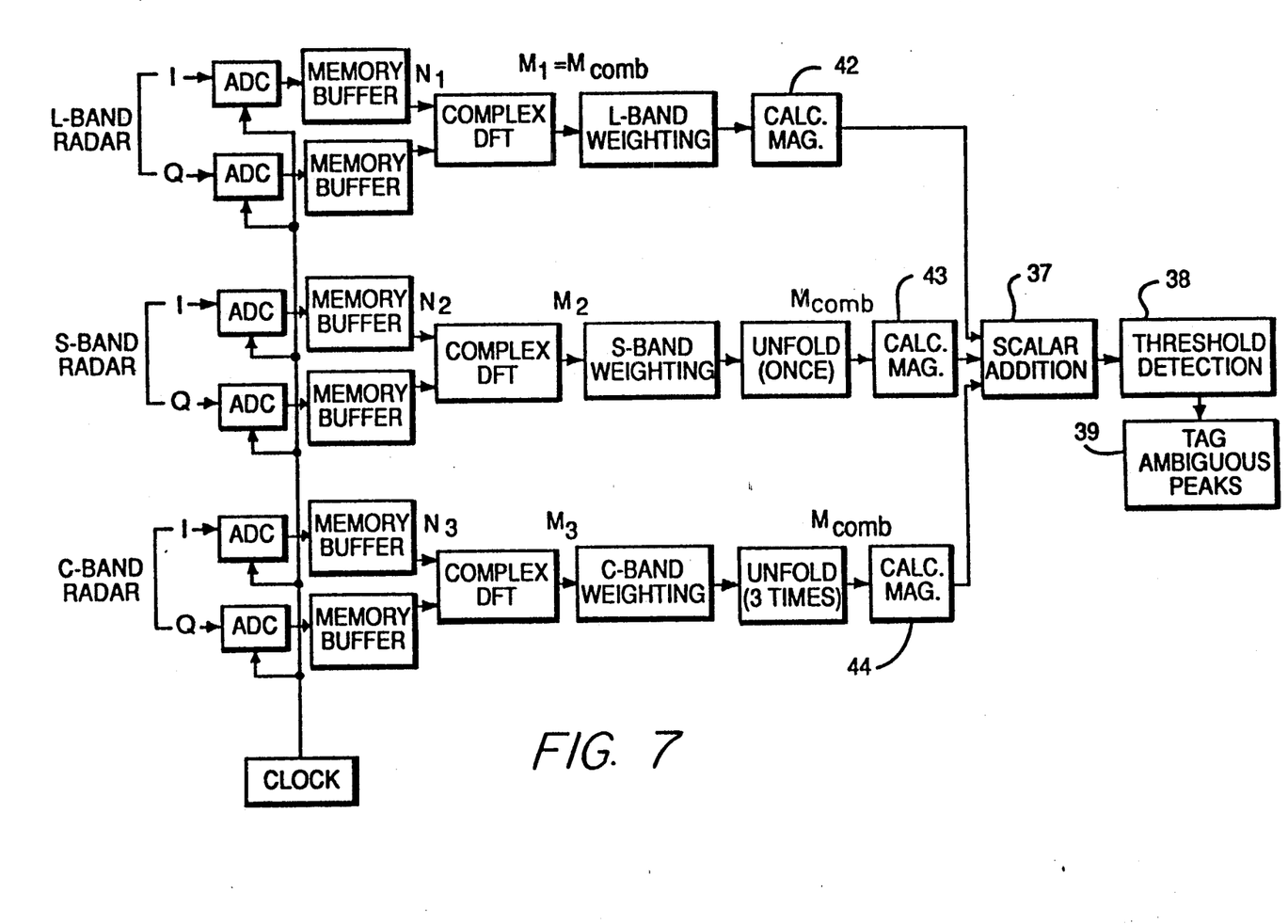
FIG. 7 is a block diagram illustrating the difference between processing noncoherent radar signals from radars having a different carrier frequency and PRF rate.

FIG. 7 illustrates a modification to the apparatus of FIG. 2 to process three radar signals which are not coherent. The three radars thus produce, after unfolding, signals which need not be phase compensated as there is no coherence between radars. Instead, each of the separate radar signals has a magnitude calculation implemented in devices 42, 43 and 44. Devices 42, 43 and 44 process I and Q data in the same manner as device 38. A simple scaler addition is applied in step 45 before going ahead and forming the same threshold calculation with circuit 38 and threshold detection in step 39. As previously, ambiguous artifacts obtained through the unfolding process are removed in step 40.

Thus, there has been described with respect to one embodiment how different radar signals tracking the same target can be combined to form a single Doppler frequency/velocity domain signal. The predetection combination of the signals provides for an improved sensitivity for this system, not obtainable through post-detection combination techniques. Those skilled in the art will recognize yet other embodiments described by the claims which follow.

What is claimed is

1. An apparatus for combining radar signals from a plurality of radars which illuminate a common target at different PRF, providing multiple samples of a plurality of range bins representing an increment of radial distance to said target comprising:

first, second and third analog-to-digital converters for respectively converting each radar signal to a digital signal representation:

first, second and third complex discrete Fourier transform filters for respectively receiving the digitized signals, said filters providing from said digitized signals first, second and third groups of velocity range bins, representing substantially the same velocity increment of said common target;

first means for unfolding said second group of velocity range bins to be identical in number to each of said first group of velocity range bins;

second means for unfolding said third group of velocity range bins to be identical in number to each of said first group of velocity range bins; and, means for combining said first group of velocity range bins with corresponding velocity range bins from said first and second means for unfolding, whereby a single group of velocity range cells are provided.

2. The apparatus of claim 1 wherein:
said first complex discrete Fourier transform filter provides a plurality of velocity range bins $N_{out}$ corresponding to the number of samples in said first radar signal; and
said second and third complex discrete Fourier transform filters provide velocity bins having a number of velocity range bins Nut from a smaller number of samples received from said second and third radars, respectively.

3. The apparatus of claim 2 wherein said second and third complex discrete Fourier transform filters have a transfer function in accordance with:

$$Y_k = (1/N) \sum_{k=1}^{N} X_k \cdot \exp\left[-j \cdot \left(\frac{4\pi V_n}{\lambda_{sensor}} (k/M)\left(\frac{1}{PRF_{sensor}}\right)\right)\right]$$

where $X_k$ is the respective sample value of said second and third radar signals which comprise a distance range bin for said second and third radars, N is the number of samples in said distance range bin, M is the number of samples in said first radar distance range bind and PRF is the respective radar pulse rate frequency.

4. The apparatus for combining radar signals from a plurality of radars according to claim 3, wherein said first and second means for unfolding comprise a device which folds the velocity range cells a number of times ($N_{folds}$) which is related to the relative PRF rates of the second and third radars to the first radar.

5. The apparatus of claim 4 wherein said first and second means for unfolding has a transfer function corresponding to:

$$Y((j \cdot M_i)+i) \, Y(i)$$

where i=1, $M_i$
j=O, $N_{folds}$, by 1
where $M_i$ represents the number of velocity bins before folding, $N_{folds}$ is the number of times $M_i$ needs to be repeated.

6. The apparatus of claim 1 wherein said first, second and third radars each produce an inphase and quadrature reflection signal.

7. The apparatus of claim 1 further comprising weighting means for weighting said first group of velocity range bins and said corresponding velocity range bins from said first and second means for unfolding to compensate for variations in gain between each of said radars.

8. An apparatus for combining radar signals from two or more radar receivers, having a different PRF and different carrier frequency illuminating a common target comprising:

means connected to each radar receiver for respectively digitizing a plurality of reflection signal samples of a corresponding plurality of radial range bins;

means for deriving from each digitized sample of each of said radial range bins a plurality of respective velocity range bins corresponding to each digitized sample;

means for compressing the velocity range bins from the respective radars having the lower PRF and lower frequency to represent an increment of velocity which corresponds to the higher PFR, higher frequency range bins, whereby common velocity corrdinates are obtained for each of said radars;

means for unfolding the respective velocity range bins obtained from the higher PRF higher frequency radars to obtain a corresponding number of compressed velocity range bins produced by said lower PRF lower frequency radar; and, means for combining said unfolded velocity range bins with corresponding compressed velocity range bins from said lower PRF radar.

9. The apparatus of claim 8 further comprising means for weighting each signal received by said combining means.

10. The apparatus of claim 8 wherein said means for compressing the velocity range bins comprises a filter having a zero fill discrete Fourier transform function.

11. The apparatus of claim 8 wherein said means for folding the velocity range bins repeating the velocity range bins over an extended velocity range.

12. The apparatus of claim 11 wherein said velocity range is defined by the lower PRF rate.

13. The apparatus of claim 12 wherein the extended velocity range is an integer multiple of the number of samples produced by each radar.

14. The apparatus of claim 8 wherein each radar produces in-phase and quadrature reflection signals from said target.

* * * * *